United States Patent
Inoue

(10) Patent No.: US 7,057,766 B1
(45) Date of Patent: Jun. 6, 2006

(54) APPARATUS FOR AND METHOD OF OUTPUTTING IMAGE

(75) Inventor: Yoshiaki Inoue, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1113 days.

(21) Appl. No.: 09/686,618

(22) Filed: Oct. 12, 2000

(30) Foreign Application Priority Data

Oct. 14, 1999 (JP) .................................. 11-292086

(51) Int. Cl.
*G06F 15/00* (2006.01)
*G03F 3/08* (2006.01)
*G06K 9/00* (2006.01)

(52) U.S. Cl. .................... 358/1.9; 358/521; 382/167
(58) Field of Classification Search ................ 358/1.9, 358/1.18, 521, 519, 523, 520, 518; 430/359, 430/502, 30; 382/169, 167; 355/71
See application file for complete search history.

(56) References Cited

U.S. PATENT DOCUMENTS

| | | | | |
|---|---|---|---|---|
| 4,009,959 A | * | 3/1977 | Watson et al. ................. 355/71 |
| 4,686,174 A | * | 8/1987 | De Keyzer et al. .......... 430/502 |
| 4,924,323 A | * | 5/1990 | Numakura et al. .......... 382/169 |
| 5,305,057 A | * | 4/1994 | Hattori et al. ............... 358/519 |
| 5,541,028 A | * | 7/1996 | Lee et al. ...................... 430/30 |
| 5,574,544 A | * | 11/1996 | Yoshino et al. ............... 399/60 |
| 5,582,626 A | * | 12/1996 | Blankenbecler ................ 65/37 |
| 5,668,890 A | * | 9/1997 | Winkelman ................. 382/167 |
| 5,729,626 A | * | 3/1998 | Hada et al. .................. 382/170 |
| 5,903,713 A | * | 5/1999 | Daels et al. .................. 358/1.9 |
| 6,006,010 A | * | 12/1999 | Hada et al. ................... 358/1.7 |
| 6,061,091 A | * | 5/2000 | Van de Poel et al. ........ 348/241 |
| 6,064,494 A | * | 5/2000 | Hirota et al. ................. 358/1.9 |
| 7,118,895 | * | 9/2000 | Hirota et al. ................ 382/165 |
| 6,190,844 B1 | * | 2/2001 | Dickerson et al. ........... 430/359 |
| 6,198,841 B1 | * | 3/2001 | Toyama et al. .............. 382/164 |
| 6,204,930 B1 | * | 3/2001 | Inoue ......................... 358/1.9 |

(Continued)

FOREIGN PATENT DOCUMENTS

JP    8-98025    4/1996

OTHER PUBLICATIONS

Sharman, Richard; Tone Scale Adjustment; Feb. 27, 2003; USPTO; US 2003/0038957 A1.*

Primary Examiner—Madeleine Nguyen
(74) Attorney, Agent, or Firm—Sughrue Mion, PLLC

(57) ABSTRACT

In a digital printing process employing a CTP device 14, hues can easily be changed in a process of generating printing plates without going back to a prior process. A plurality of gradation conversion curves whose gradation characteristics are different stepwise from each other, which are stored in a gradation conversion curve saving unit 22, are displayed on a display unit 36. The user selects a desired of the displayed gradation conversion curves with respect to at least one color element with a keyboard/mouse 34. The selected gradation conversion curve is set in an LUT converter 26. Input image data G can easily be converted into output image data Ga by converting the gradations of the input image data G according to the gradation conversion curve set in the LUT converter 26. The image data Ga is converted by a binarizing unit 30 into binary image data H, which is supplied to the CTP device 14. The CTP device 14 outputs printing plates each bearing a binary image represented by the binary image data H.

28 Claims, 14 Drawing Sheets

U.S. PATENT DOCUMENTS

| | | | |
|---|---|---|---|
| 6,229,624 B1 * | 5/2001 | Gilman et al. | 358/1.9 |
| 6,271,934 B1 * | 8/2001 | Hayashi | 358/1.9 |
| 6,278,533 B1 * | 8/2001 | Takemoto | 358/521 |
| 6,341,175 B1 * | 1/2002 | Usami | 382/167 |
| 6,384,932 B1 * | 5/2002 | Fujisawa et al. | 358/1.18 |
| 6,825,884 B1 * | 11/2004 | Horiuchi | 348/362 |
| 2001/0021042 A1 * | 9/2001 | Hirota et al. | 358/505 |
| 2001/0043368 A1 * | 11/2001 | Morikawa | 358/458 |

* cited by examiner

APPARATUS FOR AND METHOD OF OUTPUTTING IMAGE

BACKGROUND OF THE INVENTION

1. Field of the Invention

The present invention relates to an apparatus for and a method of outputting an image, which are preferably applicable to a raster image processor, for use in a CTP (Computer To Plate) device or a CTC (Computer To Cylinder) device, for converting digital image data having values ranging from 0 to 255 into binary or four-valued digital image data based on which an image is recorded according to a scanning recording process.

2. Description of the Related Art

In printing and platemaking fields, it has heretofore been customary to produce printing plates for use on printing presses with a contact printer. In recent years, efforts are being made to carry out a printing process including the production of printing plates based on digital signal processing.

It is necessary in the art of printing and platemaking that the colors of a print sample and the colors (hues) of a print produced by a printing press be equal to each other.

In the conventional printing process of producing films from a platemaking process, producing printing plates from the films, and then producing a print from the printing plates on a printing press, if the colors of the print produced by the printing press do not agree with the colors of a print sample, then the operator first attempts to adjust the amounts of inks on the printing plates on the printing press which are usually a C (cyan) plate, an M (magenta) plate, a Y (yellow) plate, and a K (black) plate.

If the first attempt fails to achieve desired color matching, then the operator produces printing plates again to obtain adjusted hues. Specifically, films are placed in contact with printing plates in a contact printer, and the printing plates are exposed to ultraviolet rays through the films for certain exposure times. At this time, the exposure times are adjusted to change respective exposure levels of the C, M, Y, K plates for thereby changing gradations, so that the hues of the entire print can be adjusted. Heretofore, the exposure times are adjusted to change exposure levels (light intensities× times) in various stages, e.g., three stages, five stages, six stages, etc.

According to a recent new process which employs a CTP device with an ancillary raster image processor (hereinafter also referred to as "RIP"), the CTP device can produce exposed printing plates directly when it is supplied with digital image data having values ranging from 0 to 255.

However, the RIP associated with the CTP device does not have any means for easily changing the gradation characteristics of entire printing plates by changing exposure levels. In order to change the gradations of entire printing plates, it is necessary for the operator to go back to the process of producing digital image data to produce corrected digital image data.

Usually, the operator who works with the CTP device is often not skilled enough to produce digital image data on a workstation or the like, which is used to produce digital image data, and finds it time-consuming to produce corrected digital image data.

Another problem is that thanks to the advance of the network technology, the CTP device or a site where the CTP device is installed is often physically spaced apart from a site where digital image data is produced, so that it is actually difficult for the operator to go back to the process of producing digital image data to correct digital image data for changing overall gradations.

There has been proposed a technique for correcting gradations for the purpose of correcting the dot gain for printing in the RIP. According to the proposed technique, a printed material having patches representing overall gradations divided in 10 stages as a test chart, and the read values of halftone % of the patches on the test chart are supplied to the RIP to correct the dot gain thereof. However, such a process is considerably complex and time-consuming. While the proposed technique makes it possible for the operator to take time to adjust the RIP at the time the CTP device is installed, it cannot correct the hues of images readily in routine work.

SUMMARY OF THE INVENTION

It is therefore an object of the present invention to provide an apparatus for and a method of outputting an image by readily correcting the hues of an image, i.e., correcting the gradations of printing plates, in a process of producing the printing plates without going back to a prior process in a digital printing process which employs a CTP device or a CTC device.

According to the present invention, there is provided an apparatus for outputting an image by generating at least one of a print, a print proof, a printing plate, and a platemaking film directly from image data including at least one color element, comprising preparing means for preparing a plurality of gradation conversion curves whose gradation characteristics are different stepwise from each other, selecting means for selecting one of the gradation conversion curves with respect to at least one color element, and gradation converting means for being supplied with image data, converting gradations of the supplied image data according to the selected gradation conversion curve, and outputting image data represented by the image data with the corrected gradations.

The preparing means prepares a plurality of gradation conversion curves whose gradation characteristics are different stepwise from each other. The selecting means selects one of the gradation conversion curves with respect to at least one color element, and sets the selected gradation conversion curve in the gradation converting means. The gradation converting means can convert gradations of the image data including at least one color element according to the gradation conversion curve which has been set, and output image data represented by the image data with the corrected gradations.

The preparing means may comprise storing means for storing the gradation conversion curves whose gradation characteristics are different stepwise from each other. Since a desired gradation conversion curve can immediately be selected from the storing means, the output image data can quickly be obtained.

The preparing means may comprise generating means for generating the gradation conversion curves whose gradation characteristics are different stepwise from each other. Therefore, the output image data can be obtained using any desired gradation conversion curve.

Each of the gradation conversion curves may have gradation changes which correspond to exposure levels in a contact exposure process for producing printing plates. Therefore, the operator who is accustomed to a conventional process of producing printing plates can convert gradations definitely without any significant organoleptic operation failures.

Specifically, each of the gradation conversion curves which has the gradation changes which correspond to the exposure levels may be indicated by a title corresponding to one of the exposure levels. Thus, a gradation conversion curve corresponding to a desired exposure level can uniquely be selected.

The gradation conversion curves whose gradation characteristics are different stepwise from each other may comprise a plurality of gradation conversion curves whose gradation characteristics are different stepwise from each other only in a highlight area, a middle-tone area, or a shadow area. Therefore, not only overall gradations can be adjusted, but also partial gradations in the highlight area, the middle-tone area, or the shadow area can be adjusted.

The apparatus may further include gradation conversion curve generating/correcting means for newly generating or correcting the gradation conversion curves. Consequently, a desired gradation conversion curve can easily be obtained.

The apparatus may further include display means for simultaneously displaying the gradation conversion curves. The user can select a desired gradation conversion curve visually with ease.

According to the present invention, there is also provided a method of outputting an image by generating at least one of a print, a print proof, a printing plate, and a platemaking film directly from image data including at least one color element, comprising the steps of preparing a plurality of gradation conversion curves whose gradation characteristics are different stepwise from each other, selecting one of the gradation conversion curves with respect to at least one color element, and converting gradations of supplied image data according to the selected gradation conversion curve, and outputting image data represented by the image data with the corrected gradations.

In the preparing step, a plurality of gradation conversion curves whose gradation characteristics are different stepwise from each other are prepared. In the selecting step, one of the gradation conversion curves is selected with respect to at least one color element. In the gradation converting step, gradations of the image data including at least one color element are converted according to the gradation conversion curve which has been selected, and image data represented by the image data with the corrected gradations is outputted. In this manner, desired output image data can easily be obtained.

The preparing step may comprise the step of storing the gradation conversion curves whose gradation characteristics are different stepwise from each other. Since a desired gradation conversion curve can immediately be selected from the stored gradation conversion curves, the output image data can quickly be obtained.

The preparing step may comprise the step of generating the gradation conversion curves whose gradation characteristics are different stepwise from each other. Therefore, the output image data can be obtained using any desired gradation conversion curve.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
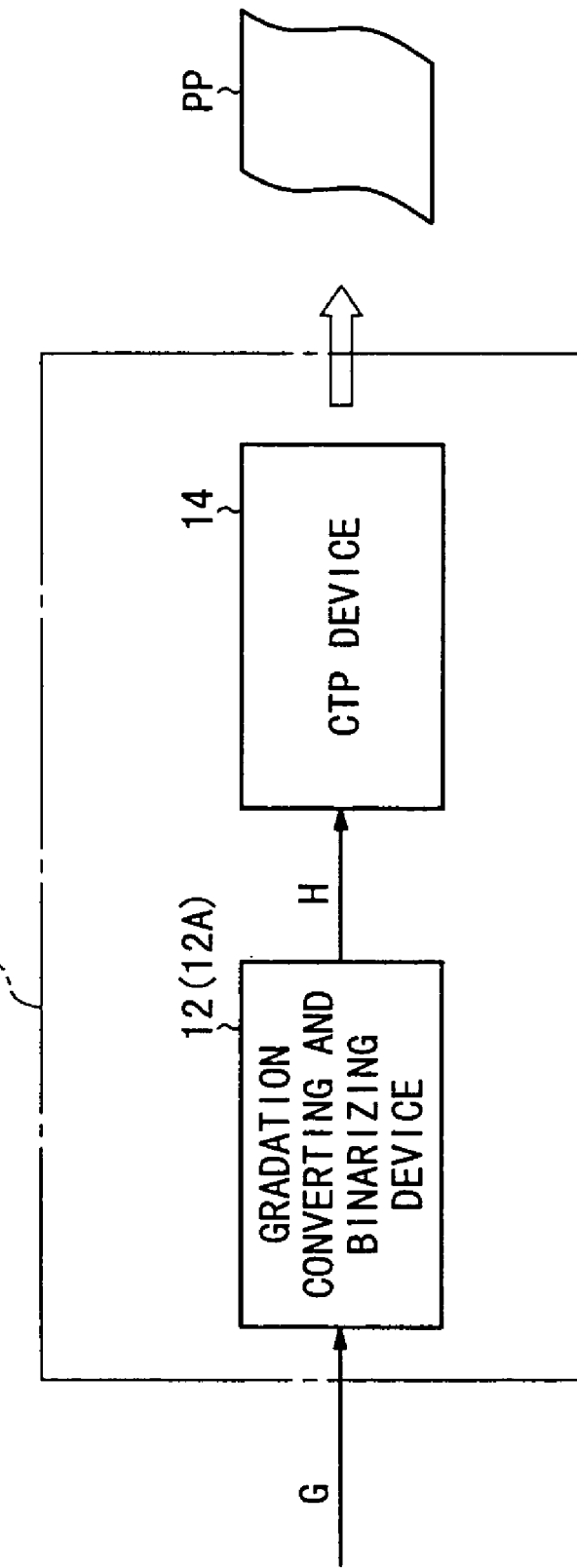
FIG. 1 is a block diagram of an image outputting apparatus according to the present invention.

FIG. 1 shows a basic arrangement of an image outputting apparatus 10 according to the present invention.

As shown in FIG. 1, the image outputting apparatus 10 comprises a gradation converting and binarizing device 12 including a raster image processor (RIP) for converting the gradations of supplied C, M, Y, K digital image data G and converting the C, M, Y, K digital image data into binary image data H for each of C, M, Y, K printing plates, and a CTP device 14 connected to the gradation converting and binarizing device 12 for outputting C, M, Y, K printing plates PP based on the binary image data H.

Even when the image outputting apparatus 10 is supplied with digital image data G of one of the colors C, M, Y, K, the image outputting apparatus 10 outputs binary image data H corresponding to the digital image data G of that one of the colors C, M, Y, K.

The C, M, Y, K digital image data G comprise digital image data G for the respective C, M, Y, K printing plates, having values ranging from 0 to 255, for example, which are generated by an editing workstation (not shown) or the like.

The image outputting apparatus 10, which basically comprises a computer, is capable of generating printing plates PP directly from the supplied digital image data G. The present invention is not limited to the image outputting apparatus 10 shown in FIG. 1, but is applicable to a CTC device for producing a print directly from digital image data including one or more color elements, a DDCP (Direct Digital Color Proof) device for producing a color proof directly from such digital image data, or a film setter for producing a platemaking film directly from such digital image data.

The CTP device 14 is a device for outputting printing plates PP by scanning plates with a laser beam that is turned on and off by the binary image data H, which is scanning image data, to recording images on the plates.

Figure 2:
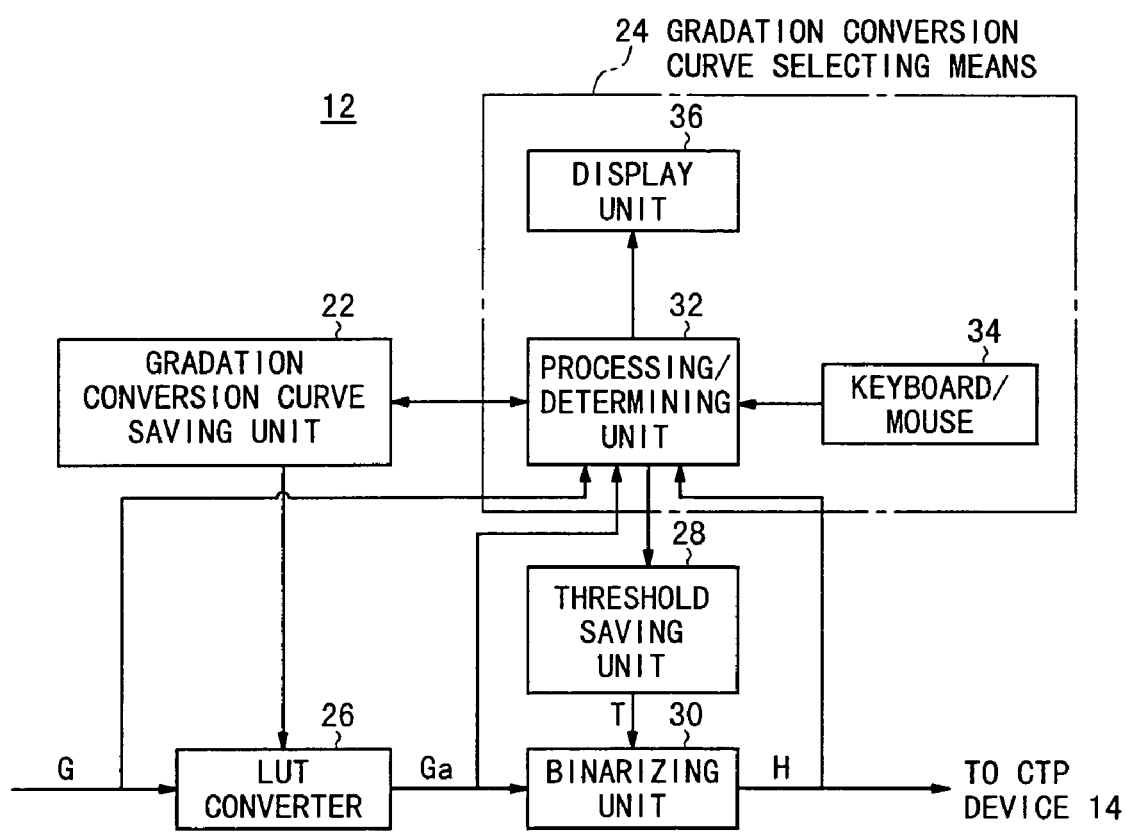
FIG. 2 is a block diagram of a gradation converting and binarizing device in the image outputting apparatus shown in FIG. 1.

FIG. 2 shows in detail the gradation converting and binarizing device 12 in the image outputting apparatus 10 shown in FIG. 1.

The gradation converting and binarizing device 12 has a gradation conversion curve saving unit 22 as a storing means for storing data of a plurality of gradation conversion curves whose gradation characteristics are different stepwise from each other, and a gradation conversion curve selecting means 24 functioning as a selecting means for selecting a desired one of the gradation conversion curves stored in the gradation conversion curve saving unit 22 with respect to at least one color element of the colors C, M, Y, K, and also functioning as an image display assisting unit for displaying images represented by image data G, Ga, H.

The gradation converting and binarizing device 12 also has an LUT (Look Up Table) converter 26 as a gradation converting means for setting therein the selected one of the gradation conversion curves. The LUT converter 26 outputs digital image data Ga which is produced by converting the gradations of the supplied digital image data G with the selected gradation conversion curve.

The gradation converting and binarizing device 12 further includes a binarizing unit 30 for comparing the gradation-converted digital image data Ga outputted from the LUT converter 26 with threshold data (threshold matrix) T (T=1, 2, . . . , 255) read from a threshold saving unit 28, and outputting binary image data H which has a value 0 (non-blackened) when Ga<T and a value 1 (blackened) when Ga≧T.

The user of the image outputting apparatus 10 can select threshold data T having a desired screen ruling and angle with the gradation conversion curve selecting means 24.

The CTP device 14 outputs C, M, Y, K printing plates PP which bears images, e.g., halftone dot images, corresponding to the binary image data H outputted from the binarizing unit 30.

The gradation conversion curve selecting means 24 has a processing/determining unit 32 incorporating a GUI (Graphical User Interface). To the processing/determining unit 32, there are connected a keyboard/mouse (keyboard and/or mouse) 34 as an input means and a display unit 36 as a display means for simultaneously displaying a plurality of gradation conversion curves stored in the gradation conversion curve saving unit 22.

The display unit 36 can display images represented by the digital image data G, Ga and images represented by the binary image data H under the control of the processing/determining unit 32.

The image outputting apparatus 10 is basically constructed as described above. Operation of the image outputting apparatus 10 will be described below.

When the image outputting apparatus 10 is turned on and the user selects a gradation conversion mode with the keyboard/mouse 34, the processing/determining unit 32 simultaneously displays a plurality of gradation conversion curves stored in the gradation conversion curve saving unit 22 on the display unit 36.

Figure 3:
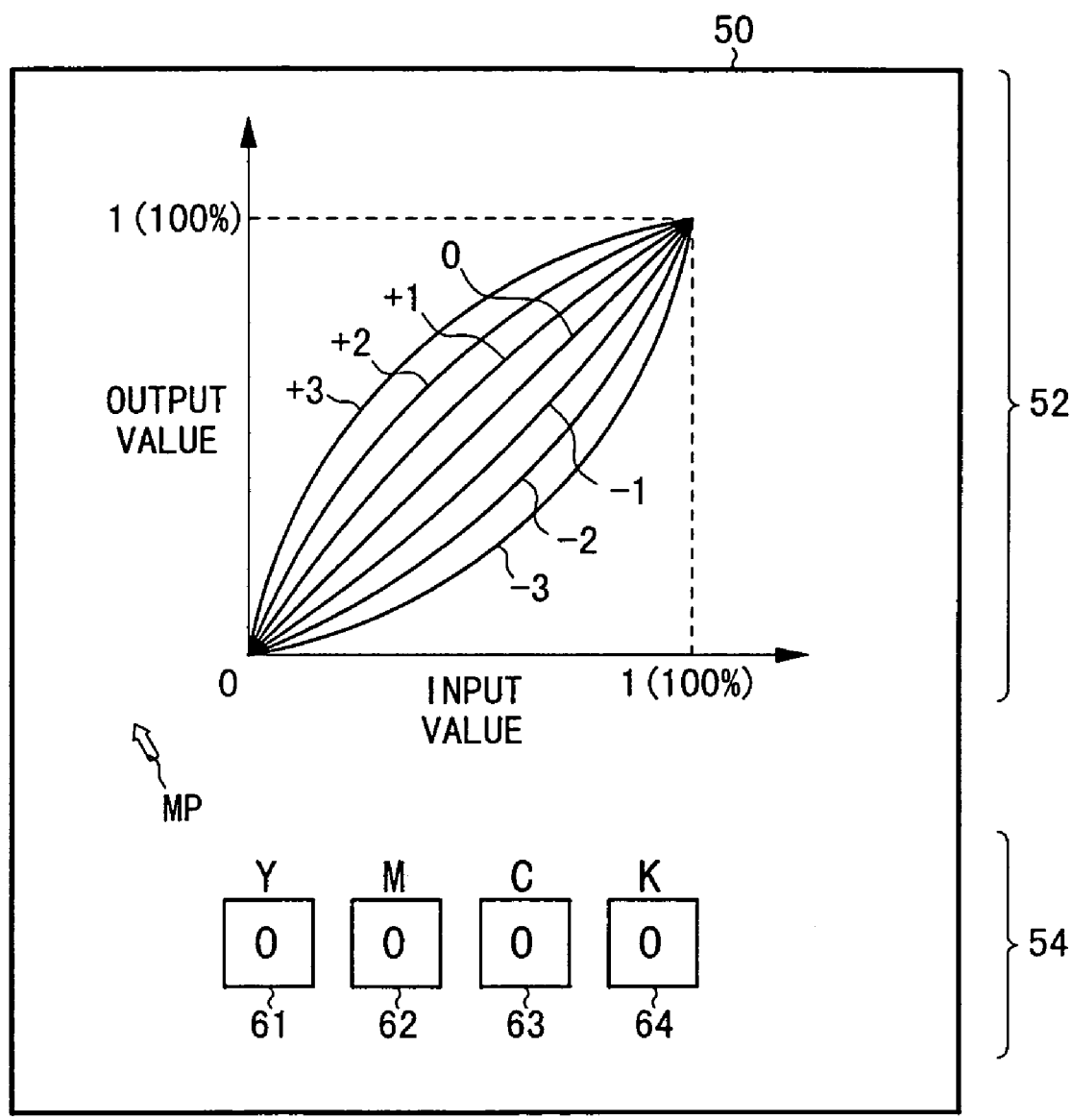
FIG. 3 shows, by way of example, a displayed view having a gradation conversion curve displaying area and a gradation conversion curve setting displaying area.

FIG. 3 shows an initial state of a displayed view 50 on the display unit 36. The displayed view 50 comprises a gradation conversion curve displaying area 52 for displaying a plurality of gradation conversion curves and a gradation conversion curve setting displaying area 54 for displaying settings of a selected gradation conversion curve.

The gradation conversion curve displaying area 52 displays seven different gradation conversion curves whose gradation characteristics are indicated respectively by "−3", "−2", "−1", "0", "+1", "+2", "+3". Each of the gradation conversion curves is a curve for converting values of input image data G (input values) into values of output image data Ga (output values) with the LUT converter 26.

If each of the gradation conversion curves is expressed by a function y=x+f(x) where x represents an input value and y represents an output value, then the function f(x) of each of the gradation conversion curves can be expressed by a quartic function $f(x)=ax^4+bx^3+cx$.

The input image data G and the output image data Ga in the gradation conversion curve displaying area 52 shown in FIG. 3 have respective full scales represented by standardized values which range from a value 0 (corresponding to G=Ga=0) to a value 1 (corresponding to G=Ga=255) or halftone dot percent values which range from a value 0% (corresponding to G=Ga=0) to a value 100% (corresponding to G=Ga=255). The full scales can also be displayed with gradation values ranging from 0 to 255.

The gradation conversion curve setting displaying area 54 shown in FIG. 3 displays color elements "Y", "M", "C", "K", and gradation conversion curve setting boxes 61, 62, 63, 64 for displaying numbers (selected ones of the numbers −3, −2, −1, 0, +1, +2, +3) indicative of the gradation characteristics of the gradation conversion curves selected for the respective color elements "Y", "M", "C", "K". In the example shown in FIG. 3, all the gradation conversion curve setting boxes 61–64 display '0'.

In order to change the value displayed in any one of the gradation conversion curve setting boxes 61, 62, 63, 64, the user places a mouse pointer MP on a desired one of these gradation conversion curve setting boxes 61, 62, 63, 64, and clicks the mouse 34, whereupon the display unit 36 displays a view for entering a desired number. Then, the user places the mouse pointer MP on a desired one of the gradation conversion curves having the gradation characteristics "−3", "−2", "−1", "0", "+1", "+2", "+3", and then clicks the mouse 34. Now, the number of the gradation characteristics of the selected gradation conversion curve is set in the desired one of the gradation conversion curve setting boxes 61–64.

Figure 4:
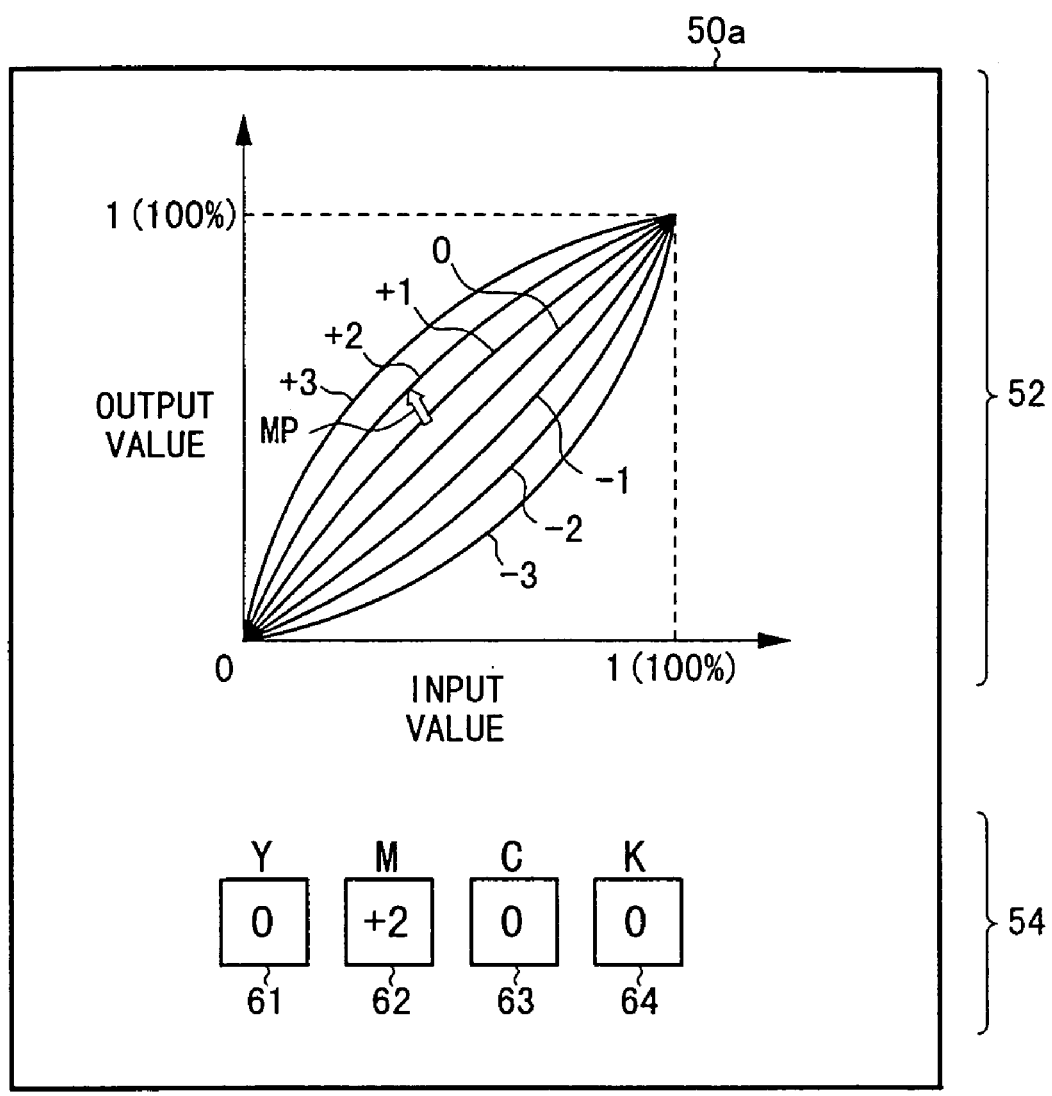
FIG. 4 shows, by way of example, a displayed view in which a desired gradation conversion curve has been selected and set.

FIG. 4 shows a displayed view 50a in which the number "+2" of the gradation characteristics of the gradation conversion curve for the magenta M is selected and set by the keyboard/mouse 34. After having selected and set the gradation conversion curves on the displayed view 50a, the user presses an execute key (not shown) on the keyboard/mouse 34. Look up tables corresponding to the gradation conversion curves (C="0", M="+2", Y="0", K="0") are successively read from the gradation conversion curve saving unit 22, and set in the LUT converter 26.

The LUT converter 26 successively converts the gradations of the supplied C, M, Y, K image data (input values) G according to the set gradation conversion curves, and outputs gradation-converted C, M, Y, K image data (output values) Ga. Specifically, the C image data Ga has been converted according to the gradation conversion curve (C="0"), the M image data Ga has been converted according to the gradation conversion curve (M="+2"), the Y image data Ga has been converted according to the gradation conversion curve (Y="0"), and the K image data Ga has been converted according to the gradation conversion curve (K="0").

The gradation-converted C, M, Y, K image data Ga are successively supplied to the binarizing unit 30, which outputs halftone dot image data as binary image data H to the CTP device 14.

Based on the binary image data H, the CTP device 14 outputs C, M, Y, K printing plates PP. For producing a print using the C, M, Y, K printing plates PP thus outputted, the M printing plate PP develops a volume greater by the gradation characteristics "+2", i.e., the M printing plate PP can carry more ink.

According to the above embodiment, as described above, in the digital printing process which employs the CTP device 14 (or a CTC device), the image outputting apparatus 10 allows the hues of an image, i.e., the gradations of printing plates, to be readily corrected in the process of producing the printing plates PP without going back to a prior process simply by selecting gradation conversion curves displayed on the display unit 36.

Since the image outputting apparatus 10 generates printing plates PP again when it corrects the gradations, the user can adjust hues, which cannot fully be adjusted by adjusting the amounts of inks in the printing process, simply based on the GUI.

The image outputting apparatus 10 can correct gradations simply and flexibly to achieve a color match between the hues and the colors of a print sample under different conditions, i.e., when a different printing press is used, or a different printing plate material is used, a different ink or print paper is used, or printing plate materials, inks, and print papers differ from lot to lot.

Figure 5:
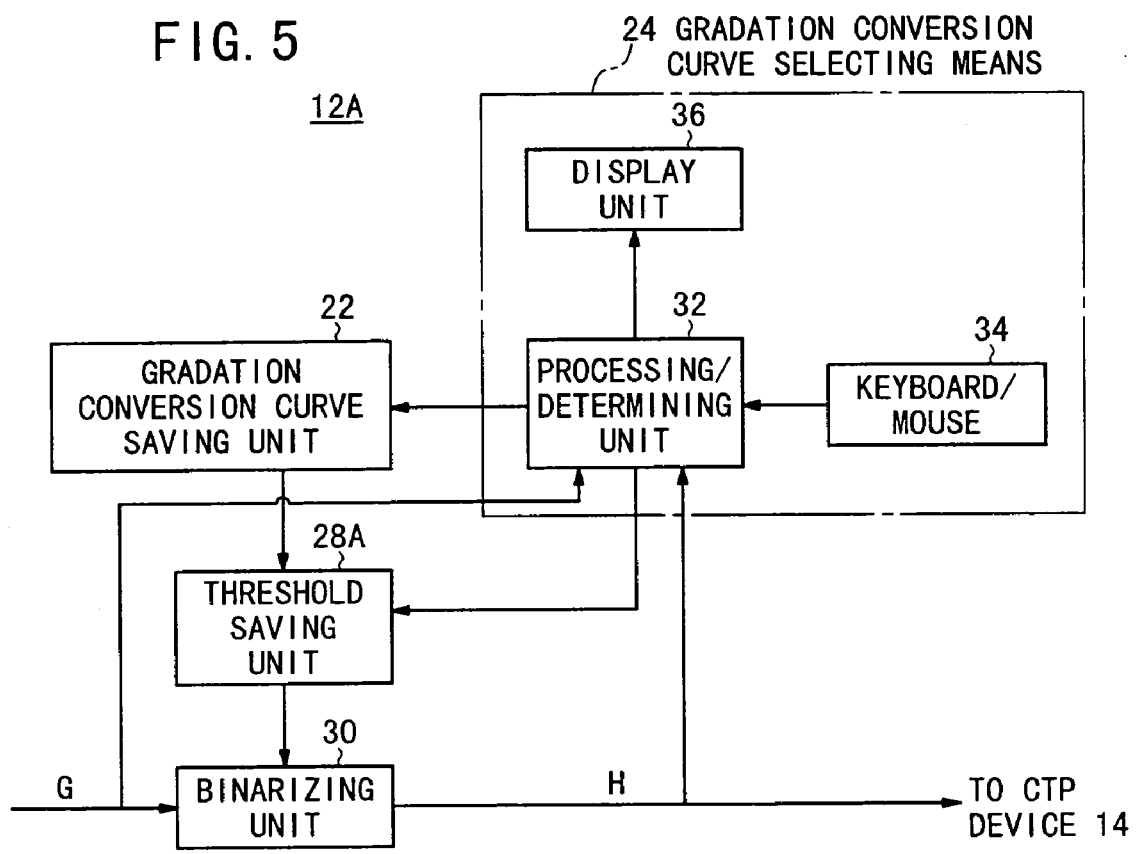
FIG. 5 is a block diagram of an alternative gradation converting and binarizing device for the image outputting apparatus shown in FIG. 1.

The gradation converting and binarizing device 12 shown in FIG. 2 may be replaced with a gradation converting and binarizing device 12A shown in FIG. 5. Those of the gradation converting and binarizing device 12A shown in FIG. 5 which are identical to those of the gradation converting and binarizing device 12 shown in FIG. 2 are denoted by identical reference characters, and will not be described in detail below.

The gradation converting and binarizing device 12A shown in FIG. 5 does not have the LUT converter 26 of the gradation converting and binarizing device 12 shown in FIG. 2, and has a threshold saving unit 28A connected between the binarizing unit 30 and the gradation conversion curve saving unit 22.

In the gradation converting and binarizing device 12A shown in FIG. 5, a gradation conversion curve selected by the gradation conversion curve selecting means 24 is incorporated in the threshold data T stored in the threshold saving unit 28A. In this manner, the binarizing unit 30 can perform a binarizing process including a gradation conversion process for generating binary image data H from digital image data G.

According to a process of incorporating a gradation conversion curve in the threshold data T, as disclosed in Japanese laid-open patent publication No. 8-98025, it is assumed that when the gradation conversion curve having the gradation characteristics "+2" (see FIG. 3) is selected, the gradation characteristics "+2" of this gradation conversion curve convert the gradations of input image data G=127 into gradations that are 20% greater, for example.

Specifically, the input image data G=127 is converted into image data G=152 ($\approx$127×1.2). For carrying out such conversion, of all the threshold data T ranging from 1 to 255 stored in the threshold saving unit 28A, threshold data T=T(1, 2, . . . , 152) up to T=152 may be converted into threshold data T=T(1, 2, . . . , 127) up to T=127. With the threshold data T thus converted, input image data G having a halftone dot % of 50% is converted into output binary image data H having a halftone dot % of 60%.

The image outputting apparatus 10 with the gradation converting and binarizing device 12A shown in FIG. 5 offers the same advantages as those of the image outputting apparatus 10 with the gradation converting and binarizing device 12 shown in FIG. 2.

Figure 6:
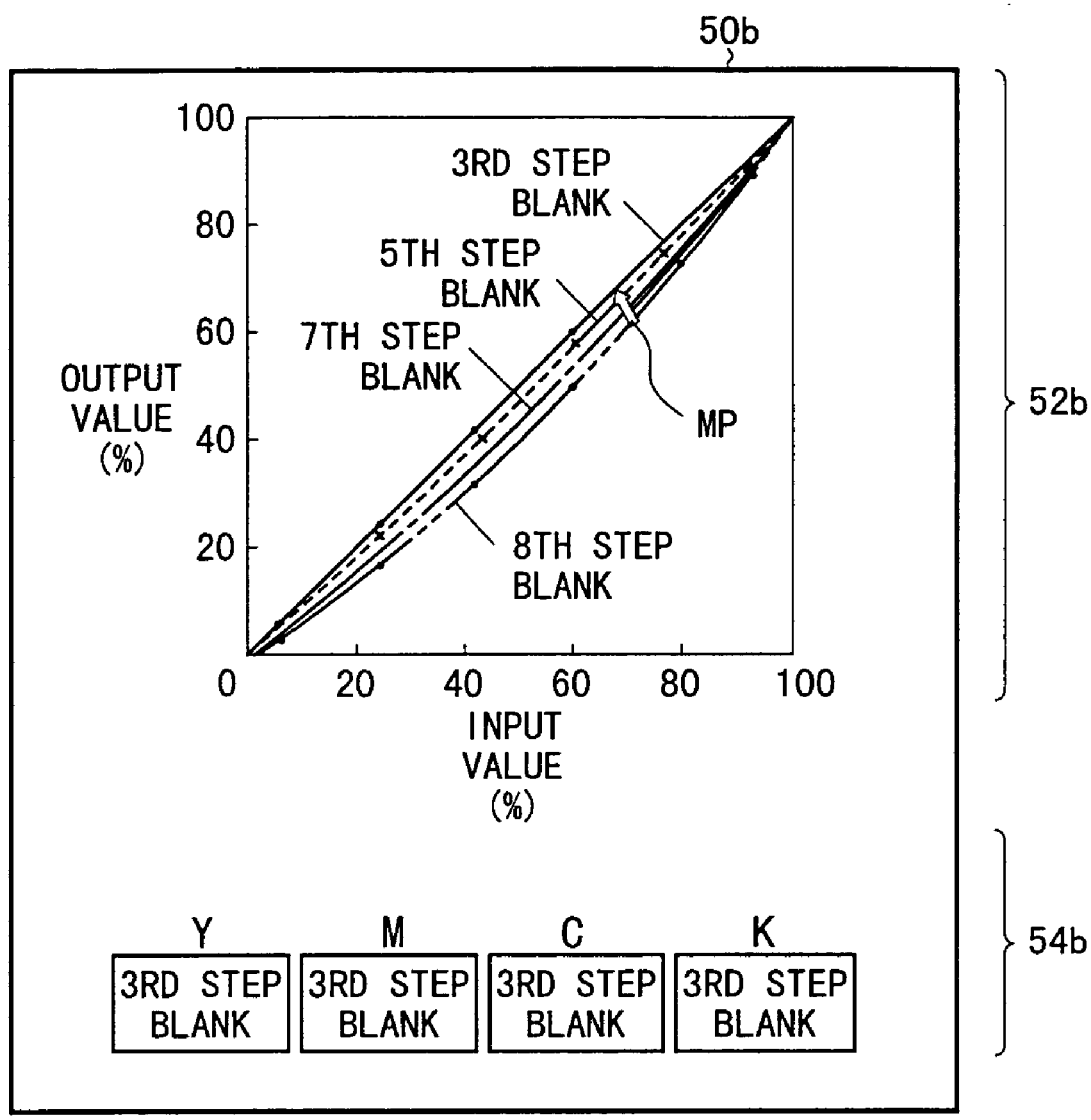
FIG. 6 shows, by way of example, another displayed view having a gradation conversion curve displaying area and a gradation conversion curve setting displaying area.

FIG. 6 shows another displayed view 50b on the display unit 36. The displayed view 50b comprises a gradation conversion curve displaying area 52b and a gradation conversion curve setting displaying area 54b. The gradation conversion curve displaying area 52b displays a plurality of gradation conversion curves each representing output halftone dot % values with respect to input halftone dot % values and having gradation changes which correspond to exposure levels in the process of exposing printing plates in contact with films to ultraviolet rays.

Specifically, the gradation conversion curves which have gradation changes corresponding to exposure levels are indicated respectively by titles "3rd step blank", "5th step blank", "7th step blank", and "8th step blank" that correspond to the respective exposure levels.

Usually, an amount of exposure to ultraviolet rays in producing a printing plate is controlled by applying density patches to the printing plate and determining up to which patch step the printing plate is left blank and from which patch step an image is produced on the printing plate. Density patches are divided in about 15 steps ranging from a highlight patch HL to a shadow patch SD in density increments or differences of 0.15, for example. The gradation conversion curve "3rd step blank" represents an amount of exposure such that a third density patch step is blank and fourth and following density patch steps carry a black image. The printing plates are of a positive type, and an area thereof which is subjected to an adequate amount of exposure is left blank. Similarly, the gradation conversion curve "5th step blank" represents an amount of exposure such that a fifth density patch step is blank and sixth and following density patch steps carry a black image. The amount of exposure of the gradation conversion curve "5th step blank" is twice the amount of exposure of the gradation conversion curve "3rd step blank". The gradation conversion curves "7th step blank", "8th step blank" represent respective amounts of exposure such that respective seventh and eighth density patch steps are blank. For positive-type printing plates, as the number of patch steps increases, a greater amount of exposure is applied and a greater blank area is produced, with halftone dot % decreasing.

In the example shown in FIG. 6, the mouse pointer MP is placed on the gradation conversion curve "3rd step blank" in the gradation conversion curve displaying area 52b. In the gradation conversion curve setting displaying area 54b, "3rd step blank" is displayed in all the gradation conversion curve setting boxes 61–64 associated with the color elements "Y", "M", "C", "K".

Since a desired gradation conversion curve can be selected in the displayed view 50b shown in FIG. 6, the operator who is accustomed to the conventional contact exposure process for producing printing plates is allowed to select a desired gradation conversion curve highly simply based on the experience.

The gradation conversion curves having the gradation characteristics displayed in the gradation conversion curve setting displaying area 54b are saved as data in the gradation conversion curve saving unit 22. A gradation conversion curve selected by the gradation conversion curve selecting means 24 is read from the gradation conversion curve saving unit 22. In the gradation converting and binarizing device 12 shown in FIG. 2, the read gradation conversion curve is set in the LUT converter 26. In the gradation converting and binarizing device 12A shown in FIG. 5, the read gradation conversion curve is incorporated in the threshold data T, i.e., converts the threshold data T, stored in the threshold saving unit 28A.

By thus registering gradation conversion curves as curves corresponding to the conventional exposure levels, the operator who is accustomed to the conventional process of producing printing plates can perform a new process involving the CTP device 14 on the image outputting apparatus 10 using the image correcting know-how gained in the conventional process. Therefore, the image outputting apparatus 10 which operates based on digital data can smoothly be introduced into an environment based on the conventional skill and experience.

The process of converting gradations using the gradation conversion curves displayed in the displayed views 50, 50a, 50b shown in FIGS. 3, 4, and 6 serves to convert all input gradations ranging from 0% to 100% into output gradations.

However, the gradation characteristics of gradation conversion curves that can be stored in the gradation conversion curve saving unit 22 are not limited to the conversion of all input gradations. As indicated by a displayed view 50c shown in FIG. 7, the gradation conversion curve saving unit 22 can store gradation conversion curves capable of independently converting the gradations in a highlight (HL) area, a middle-tone (MD) area, and a shadow (SD) area.

Figure 7:
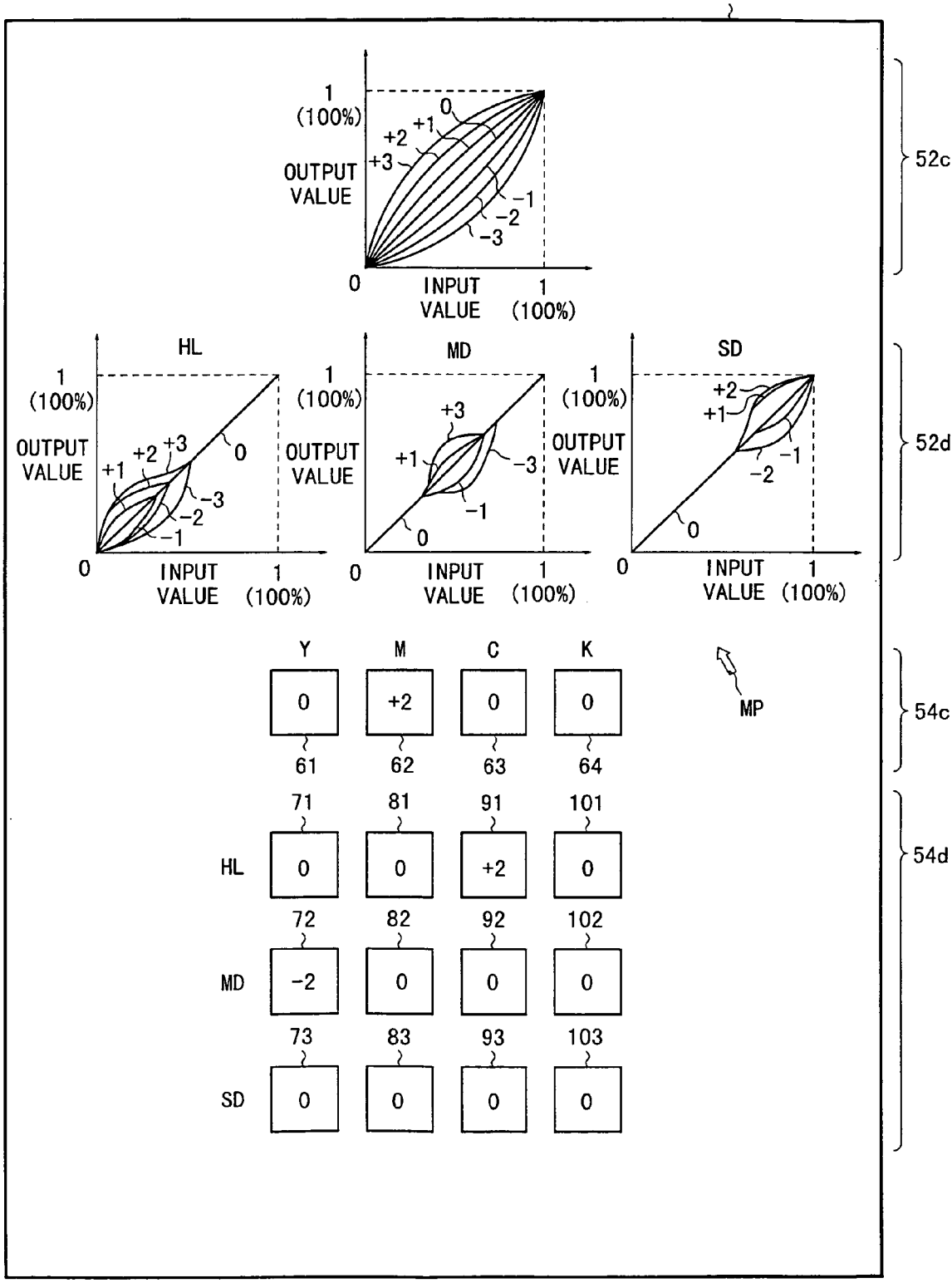
FIG. 7 shows, by way of example, still another displayed view having gradation conversion curve displaying areas and gradation conversion curve setting displaying areas.

In the example shown in FIG. 7, seven gradation conversion curves "0", "+1", "+2", "+3", "−1", "−2", "−3" can be selected in the highlight area, five gradation conversion curves "0", "+1", "+3", "−1", "−3" can be selected in the middle-tone area, and five gradation conversion curves "0", "+1", "+2", "−1", "−2" can be selected in the shadow area.

The displayed view 50c shown in FIG. 7 has a gradation conversion curve displaying area 52c for displaying a plurality of gradation conversion curves for converting overall gradations, and a gradation conversion curve displaying area 52d for displaying a plurality of gradation conversion curves in each of the highlight area, the middle-tone area, and the shadow area.

The displayed view 50c also has a gradation conversion curve setting displaying area 54c for displaying settings of a gradation conversion curve selected from the gradation conversion curve displaying area 52c, including color elements "Y", "M", "C", "K", and gradation conversion curve setting boxes 61, 62, 63, 64 therefor.

The displayed view 50c further has a gradation conversion curve setting displaying area 54d for displaying settings of partial gradation conversion curves selected from the gradation conversion curve displaying area 52d.

The gradation conversion curve setting displaying area 54d comprises partial gradation conversion curve setting boxes 71, 72, 73 for the highlight area, the middle-tone area, and the shadow area relative to the color Y (Y printing plate), partial gradation conversion curve setting boxes 81, 82, 83 for the highlight area, the middle-tone area, and the shadow area relative to the color M (M printing plate), partial gradation conversion curve setting boxes 91, 92, 93 for the highlight area, the middle-tone area, and the shadow area relative to the color C (C printing plate), and partial gradation conversion curve setting boxes 101, 102, 103 for the highlight area, the middle-tone area, and the shadow area relative to the color K (K printing plate).

It can be seen from the settings displayed in the gradation conversion curve setting displaying area 54c and the gradation conversion curve setting displaying area 54d shown in FIG. 7 that an overall gradation conversion process is performed to increase the volume of the magenta M by "+2", a partial gradation conversion process is performed to reduce the volume of the middle-tone area of the yellow Y by "−2", a partial gradation conversion process is performed to increase the volume of the highlight area of the cyan C, and no gradation conversion is effected on the color K.

The gradation converting and binarizing devices 12, 12A having the gradation conversion curve saving unit 22 for storing the gradation conversion curves displayed in the displayed view 50c shown in FIG. 7 are capable of independently converting overall gradations, and also capable of independently converting partial gradations in the highlight area, the middle-tone area, and the shadow area. In addition, the gradation converting and binarizing devices 12, 12A can convert a combination of overall gradations and partial gradations in the highlight area, the middle-tone area, and the shadow area.

Figure 8:
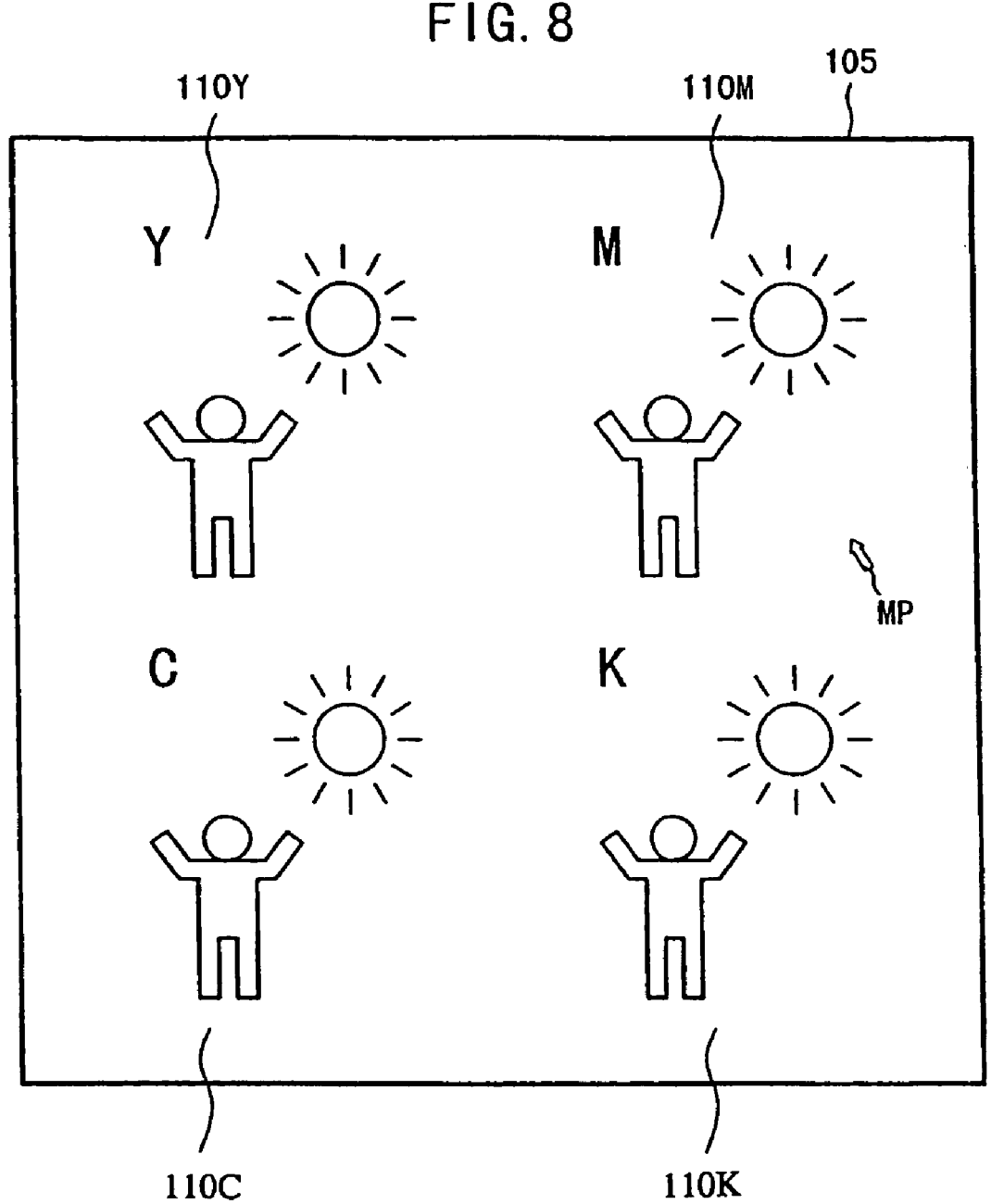
FIG. 8 is a view showing displayed binary images.

According to another embodiment, when the image data G supplied to the gradation converting and binarizing devices 12, 12A comprises one page of image data G and the display unit 36 displays an image 105 shown in FIG. 8 (register marks and rules are omitted) based on binary image data H converted from the one page of image data by the binarizing unit 30 under the control of the processing/determining unit 32, the user may indicate the areas of a yellow plate image 110Y, a magenta plate image 110M, a cyan plate image 110C, and a black plate image 110K with the keyboard/mouse 34 and the mouse pointer MP, and set desired gradation curves for each of the indicated areas according to the preference of the user.

The gradation conversion curve selecting means 24 also has a function to display the yellow plate image 110Y, the magenta plate image 110M, the cyan plate image 110C, and the black plate image 110K in superposed relation as a color image on the display unit 36.

The user can also set identical gradation conversion curves for the entire one-page image 105 with the keyboard/mouse 34 and the mouse pointer MP. If the image 105 shown in FIG. 8 is simultaneously displayed in the displayed view 50c shown in FIG. 7, the user can easily select gradation conversion curves.

According to still another embodiment, the gradation conversion curves stored in the gradation conversion curve saving unit 22 can be newly generated or corrected and then saved by the processing/determining unit 32 as follows:

The gradation conversion curve selecting means 24 shown in FIGS. 2 and 5 functions as a generating means for generating, or a correcting means for correcting, a plurality of gradation conversion curves whose gradation characteristics are different stepwise from each other.

While the gradation conversion curve saving unit 22 should preferably be present from the standpoint of the processing speed, it is not necessarily an indispensable component if there is a memory limitation in hardware. If the gradation conversion curve saving unit 22 is omitted, then gradation conversion curves generated or corrected by the processing/determining unit 32 according suitable equations may be set directly in the LUT converter 26 or the threshold saving unit 28A. At this time, since the processing/determining unit 32 (in a wider meaning, the gradation conversion curve selecting means 24) serves as a means for setting gradation conversion curves in the LUT converter 26 or the threshold saving unit 28A, the processing/determining unit 32 functions as a preparing means for preparing a plurality of gradation conversion curves whose gradation characteristics are different stepwise from each other.

In the gradation converting and binarizing device 12A, gradation conversion curves generated (prepared) by the processing/determining unit (preparing means) 32 may be incorporated directly in the threshold data T stored in the threshold saving unit 28A.

In the gradation converting and binarizing devices 12, 12A, the respective threshold saving units 28, 28A may be omitted. If the respective threshold saving units 28, 28A are omitted, then the processing/determining unit 32 may be arranged to generate and correct thresholds.

A process of newly generating or correcting a plurality of gradation conversion curves to be stored in the gradation conversion curve saving unit 22 with the processing/determining unit 32 will be described below.

Figure 9:
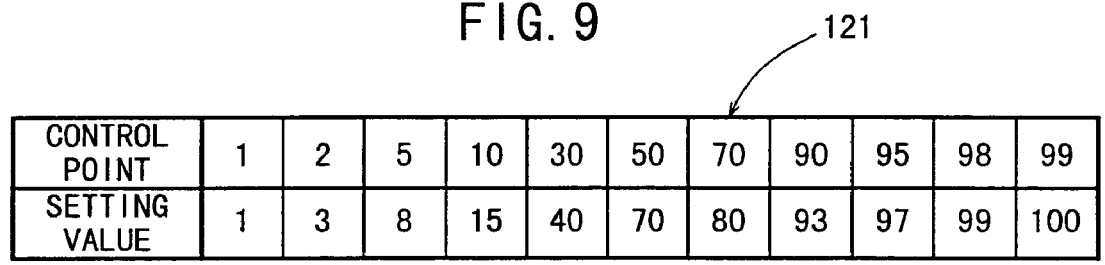
FIG. 9 is a view of a displayed control point/setting value display image for use in generating and correcting gradation conversion curves.

A control point/setting value display image (control point/setting value display table) 121 shown in FIG. 9 is displayed on the display unit 36, and the user determines setting values (%) (1, 3, 8, 15, 40, 70, 80, 93, 97, 99, 100 in this example) corresponding to respective output vales (%) at respective control points (%) (1, 2, 5, 10, 30, 50, 70, 90, 95, 98, 99 in this example) corresponding to input values (%) determined in advance by the image outputting apparatus 10, and enters the determined setting values (%) with the keyboard/mouse 34.

In the example shown in FIG. 9, the values of the predetermined control points (%) are "1, 2, 5, 10, 30, 50, 70, 90, 95, 98, 99" representing finely divided points in the highlight and shadow areas and increments of 10% in the middle-tone area, and the values of the entered setting values (%) are "1, 3, 8, 15, 40, 70, 80, 93, 97, 99, 100".

Figure 10:
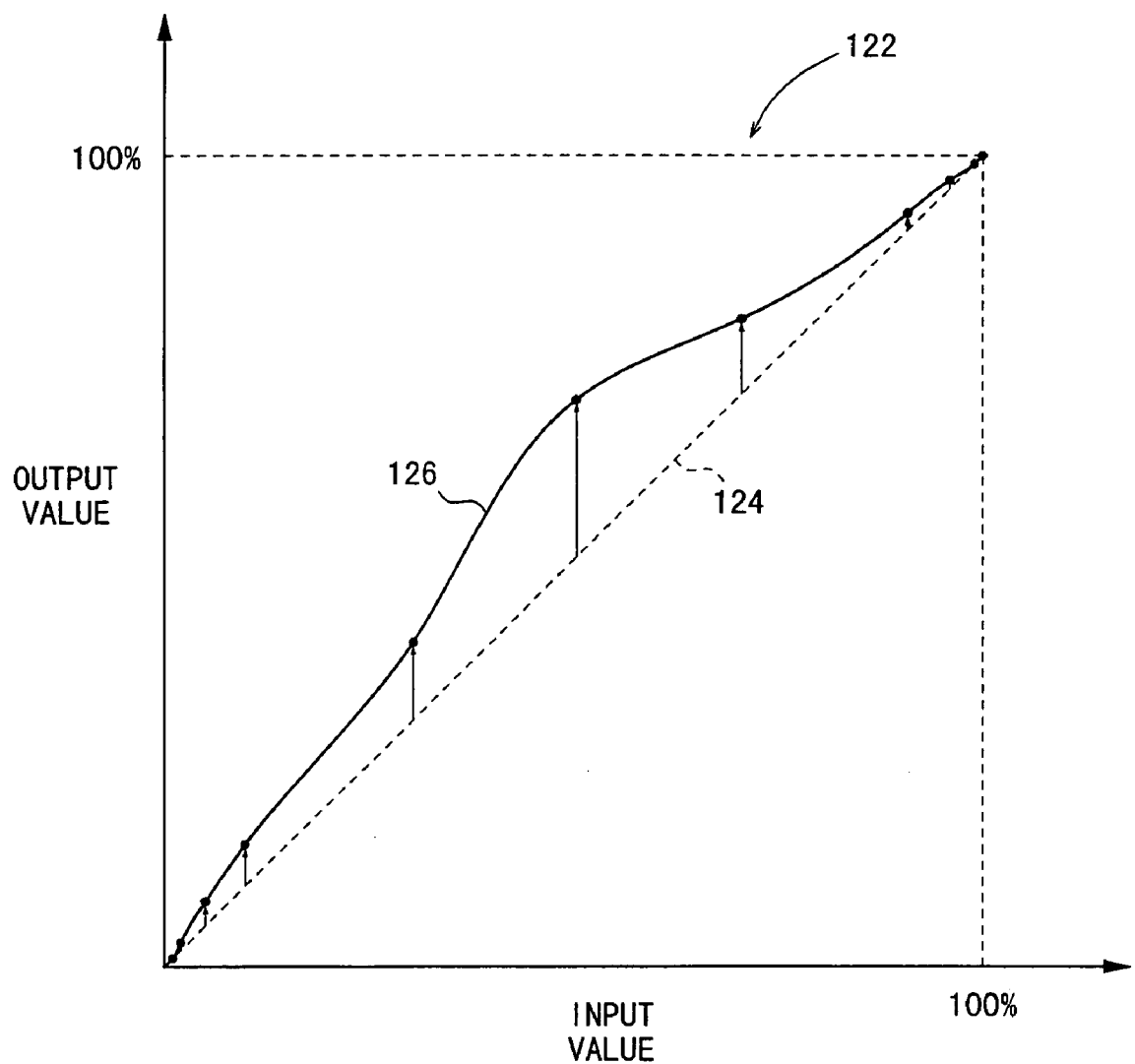
FIG. 10 is a diagram illustrative of the generation of a gradation conversion curve passing through setting values.

FIG. 10 shows an image 122 of a gradation conversion curve generating view which is displayed on the display unit 36 so as to correspond to the control point/setting value display image 121. In this embodiment, a gradation conversion curve 126 is generated (plotted) according to a least square approximation process effected on the setting values (%) "1, 3, 8, 15, 40, 70, 80, 93, 97, 99, 100". However, the gradation conversion curve 126 may be generated according to an nth-degree curve approximation process or a spline curve approximation process. A dotted-line gradation conversion curve 124 shown in FIG. 10 comprises a linear curve represented by y=x.

If the gradation conversion curve 126 is regarded as a gradation conversion curve with halftone dot % changed to a maximum, then a gradation conversion curve 128 (see FIG. 11) with halftone dot % changed to a minimum is generated according the same process as with the gradation conversion curve 126.

Then, the number of gradation conversion curves to be generated is set. If the number of gradation conversion curves to be generated is set to "4", then two gradation conversion curves 130, 132 that internally divide the generated gradation conversion curves 126, 128 are generated.

For correcting the gradation conversion curves 126, 128, 130, 132, the user may change setting values to be given to necessary control points in the control point/setting value display image 121 shown in FIG. 9.

In this manner, the gradation converting and binarizing device 12 (12A) is capable of newly generating and correcting a gradation conversion curve. A gradation conversion curve thus generated and corrected may be stored with a suitable file name in the gradation conversion curve saving unit 22.

Figure 12:
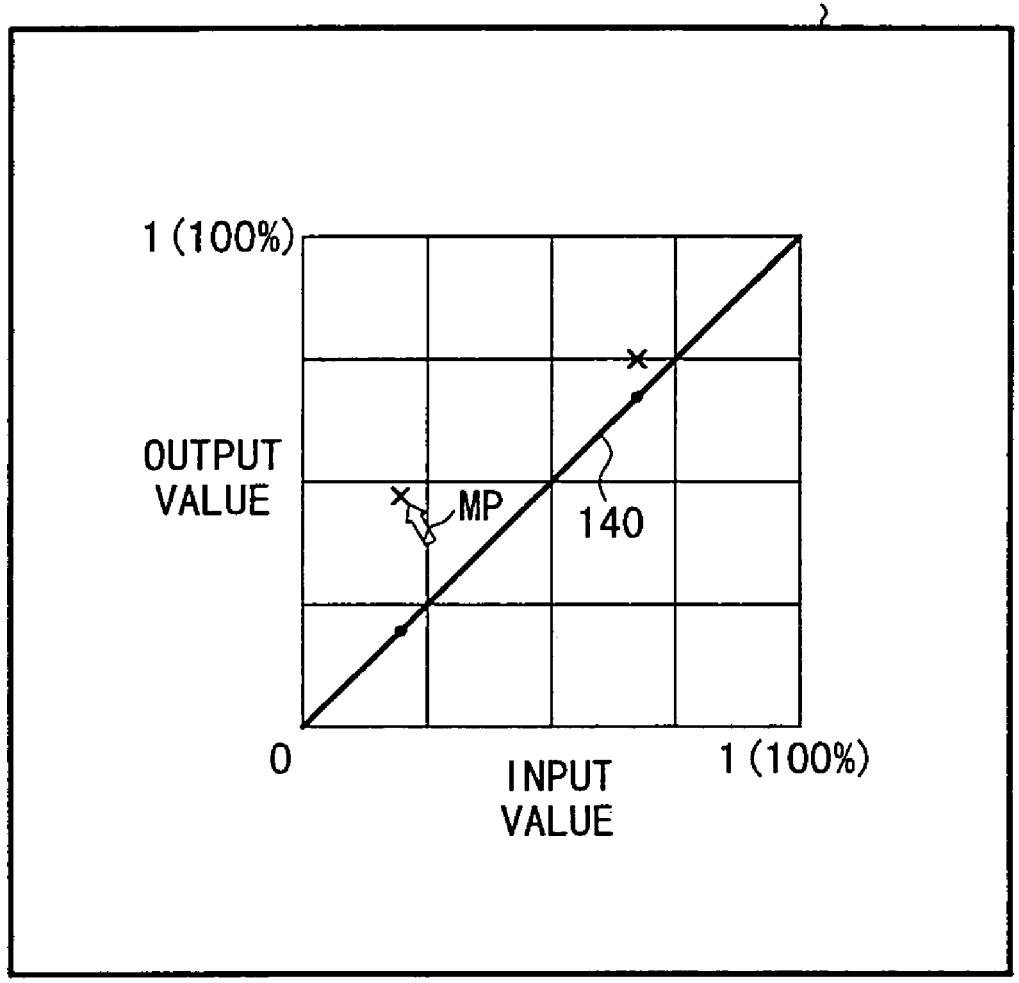
FIG. 12 is a diagram illustrative of another example of the generation of a gradation conversion curve.

For generating and correcting the gradation conversion curve 126 with the GUI, the user holds a desired point on an existing gradation conversion curve, such as a linear gradation conversion curve 140 shown in FIG. 12, displayed on the display unit 36 with the mouse pointer MP using the keyboard/mouse 34, and drags the held point to a desired gradation conversion position indicated by "x".

Figure 13:
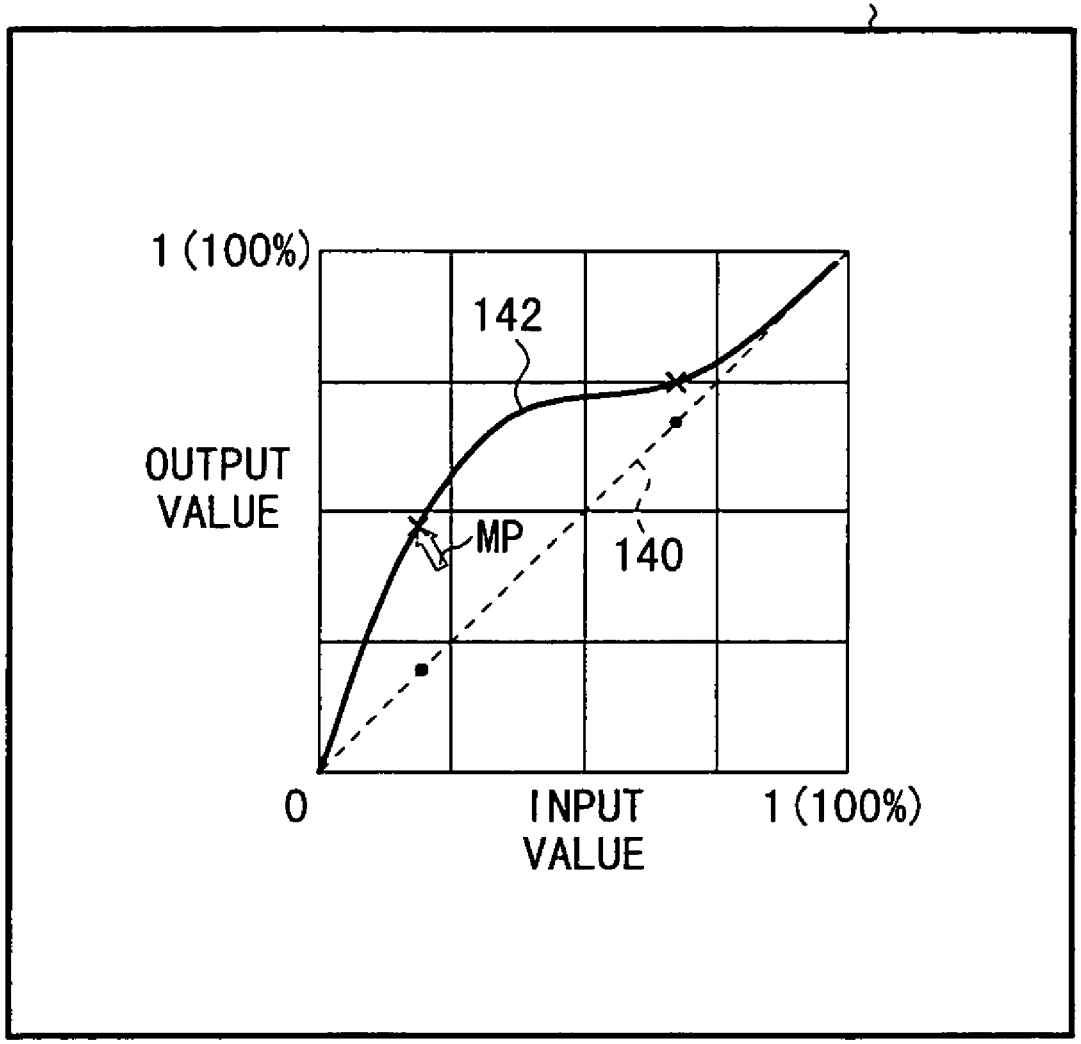
FIG. 13 is a diagram illustrative of still another example of the generation of a gradation conversion curve.
Figure 14:
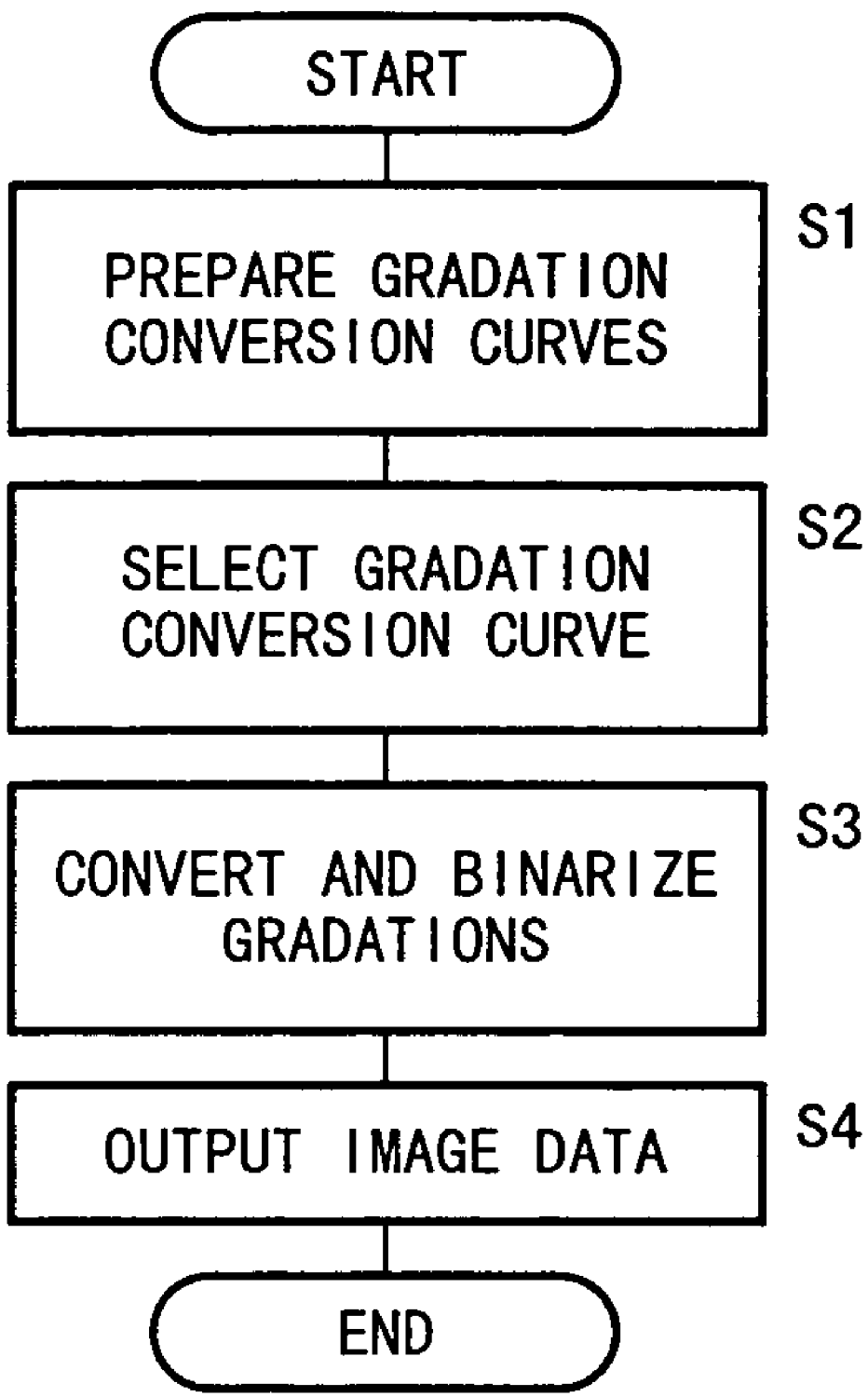
FIG. 14 is a flowchart of a processing sequence of the image outputting apparatus.

At this time, as shown in FIG. 13, the processing/determining unit 32 automatically generates a gradation conversion curve 142 that passes through the point dragged by the keyboard/mouse 34.

Figure 11:
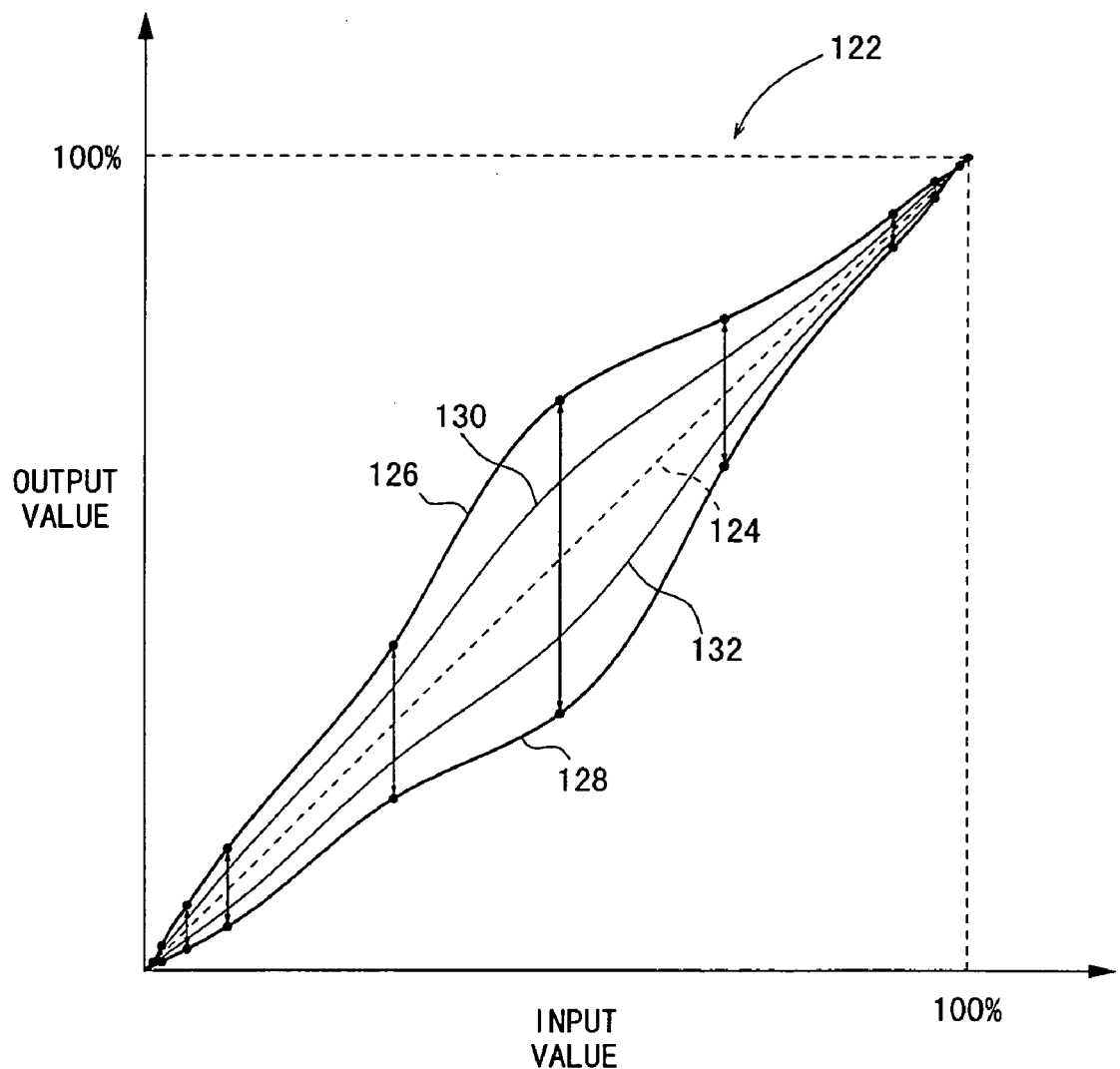
FIG. 11 is a diagram illustrative of the generation of a plurality of gradation conversion curves.

If the gradation conversion curve 142 thus generated is regarded as a gradation conversion curve with halftone dot % changed to a maximum, then a gradation conversion curve with halftone dot % changed to a minimum is generated according the same process as with the gradation conversion curve shown in FIG. 11.

Then, the number of gradation conversion curves to be generated is set. If the number of gradation conversion curves to be generated is set to "4", then two gradation conversion curves that internally divide the generated gradation conversion curves are generated. In this fashion, desired gradation conversion curves are generated or corrected.

In the above embodiment, when printing plates PP are to generated from the C, M, Y, K image data G by the image outputting apparatus 10, in a preparing process in step S1, a plurality of gradation conversion curves whose gradation characteristics are different stepwise from each other are prepared and displayed on the display unit 36. Alternatively, as described above, gradation conversion curves generated and stored in the gradation conversion curve saving unit 22 may be used, or gradation conversion curves may be newly generated by the processing/determining unit 32.

In a selecting process in step S2, the user selects a desired gradation conversion curve from the gradation conversion curves displayed on the display unit 36 using the keyboard/mouse 34. The selected gradation conversion curve is set in the LUT converter 26 or the threshold saving unit 28A.

In a gradation converting and binarizing process in step S3, the LUT converter 26 converts the gradations of C, M, Y, K image data G, and thereafter the binarizing unit 30 binarizes the gradation-converted C, M, Y, K image data G (see FIG. 2). Alternatively, the binarizing unit 30 converts the gradations of C, M, Y, K image data G and binarizes the gradation-converted C, M, Y, K image data G (see FIG. 5).

Finally, in an outputting process in step S4, the CTP device 14 generates and outputs printing plates PP from binary image data H generated in step S3.

In this manner, the image outputting apparatus 10 can correct the hues of an image, i.e., correct the gradations of printing plates, in the process of producing the printing plates without going back to a prior process.

According to the present invention, as described above, hue adjustments, which cannot be sufficiently be achieved by adjusting the amounts of inks in the printing process, can easily be performed in the image outputting apparatus which is capable of generating at least one of a print, a print proof, a printing plate, and a platemaking film directly from digital image data including one or more color elements.

The image outputting apparatus can correct gradations simply and flexibly to achieve a color match between the hues and the colors of a print sample under different conditions, i.e., when a different printing press is used, or a different printing plate material is used, a different ink or print paper is used, or printing plate materials, inks, and print papers differ from lot to lot.

Furthermore, gradations in a partial density area (the highlight, middle-tone, or shadow area or a combination thereof), which have heretofore been difficult to correct by adjusting exposure levels in the conventional contact exposure process, can easily be corrected.

Inasmuch as each of a plurality of gradation conversion curves has gradation changes which correspond to exposure levels in the process of exposing printing plates in contact with films to ultraviolet rays, the operator can perform a new process involving the CTP device or the like on the image outputting apparatus using the image correcting know-how gained in the conventional process. Therefore, an apparatus such as a plate setter or the like can smoothly be introduced into the recent printing process based on digital image data.

Although certain preferred embodiments of the present invention have been shown and described in detail, it should be understood that various changes and modifications may be made therein without departing from the scope of the appended claims.

What is claimed is:

1. An apparatus for outputting an image by generating at least one of a print, a print proof, a printing plate, and a platemaking film directly from image data including at least one color element, comprising:
   preparing means for preparing a plurality of gradation conversion curves whose gradation characteristics are different stepwise from each other;
   selecting means for selecting one of said gradation conversion curves with respect to at least one color element; and
   gradation converting means for being supplied with image data, converting gradations of the supplied image data according to the selected gradation conversion curve, and outputting image data represented by the image data with the corrected gradations.

2. An apparatus according to claim 1, wherein said preparing means comprises storing means for storing the gradation conversion curves whose gradation characteristics are different stepwise from each other.

3. An apparatus according to claim 2, further comprising:
   gradation conversion curve generating/correcting means for newly generating or correcting said gradation conversion curves.

4. An apparatus according to claim 1, wherein said preparing means comprises generating means for generating the gradation conversion curves whose gradation characteristics are different stepwise from each other.

5. An apparatus according to claim 1, wherein each of said gradation conversion curves has gradation changes which correspond to exposure levels in a contact exposure process for producing printing plates.

6. An apparatus according to claim 5, wherein each of said gradation conversion curves which has the gradation changes which correspond to said exposure levels is indicated by a title corresponding to one of the exposure levels.

7. An apparatus according to claim 1, wherein said gradation conversion curves whose gradation characteristics are different stepwise from each other comprise a plurality of gradation conversion curves whose gradation characteristics are different stepwise from each other only in a highlight area, a middle-tone area, or a shadow area.

8. An apparatus according to claim 1, further comprising:
   display means for simultaneously displaying said gradation conversion curves.

9. The apparatus of claim 1, wherein each of the gradation conversion curves is expressed by a fourth-order polynomial.

10. The apparatus of claim 9, wherein stepwise difference is the difference between two adjacent gradation conversion curves based a difference in a constant in the fourth-order polynomial.

11. A method of outputting an image by generating at least one of a print, a print proof, a printing plate, and a platemaking film directly from image data including at least one color element, comprising the steps of:
    preparing a plurality of gradation conversion curves whose gradation characteristics are different stepwise from each other;
    selecting one of said gradation conversion curves with respect to at least one color element; and
    converting gradations of supplied image data according to the selected gradation conversion curve, and outputting image data represented by the image data with the corrected gradations.

12. A method according to claim 11, wherein said step of preparing comprises the step of:
    storing the gradation conversion curves whose gradation characteristics are different stepwise from each other.

13. A method according to claim 11, wherein said step of preparing comprises the step of:
    generating the gradation conversion curves whose gradation characteristics are different stepwise from each other.

14. A method according to claim 11, wherein each of said gradation conversion curves has gradation changes which correspond to exposure levels in a contact exposure process for producing printing plates.

15. A method according to claim 14, wherein each of said gradation conversion curves which has the gradation changes which correspond to said exposure levels is indicated by a title corresponding to one of the exposure levels.

16. A method according to claim 11, wherein said gradation conversion curves whose gradation characteristics are different stepwise from each other comprise a plurality of gradation conversion curves whose gradation characteristics are different stepwise from each other only in a highlight area, a middle-tone area, or a shadow area.

17. The method of claim 9, wherein each of the gradation conversion curves is expressed by a fourth-order polynomial.

18. The method of claim 17, wherein stepwise difference is the difference between two adjacent gradation conversion curves based a difference in a constant in the fourth-order polynomial.

19. An apparatus for outputting an image by generating at least one of a print, a print proof, a printing plate, and a platemaking film directly from image data including at least one color element, comprising:
    a preparing unit preparing a plurality of gradation conversion curves whose gradation characteristics are different stepwise from each other;
    a selecting unit selecting one of said gradation conversion curves with respect to at least one color element;
    a gradation converting unit being supplied with image data, converting gradations of the supplied image data according to the selected gradation conversion curve; and
    an output device outputting image data represented by the image data with the corrected gradations.

20. The apparatus according to claim 19, wherein said preparing unit comprises a storing device for storing the gradation conversion curves.

21. The apparatus according to claim 20, further comprising:
a gradation conversion curve generating/correcting device for newly generating or correcting said gradation conversion curves.

22. The apparatus according to claim 19, wherein said preparing unit comprises generating device for generating the gradation conversion curves.

23. The apparatus according to claim 19, wherein each of said gradation conversion curves has gradation changes which correspond to exposure levels in a contact exposure process for producing printing plates.

24. The apparatus according to claim 23, wherein each of said gradation conversion curves which has the gradation changes which correspond to said exposure levels is indicated by a title corresponding to one of the exposure levels.

25. The apparatus according to claim 19, wherein said gradation conversion curves are different stepwise from each other only in a highlight area, a middle-tone area, or a shadow area.

26. The apparatus according to claim 19, further comprising:
a display device simultaneously displaying said gradation conversion curves.

27. The apparatus of claim 19, wherein each of the gradation conversion curves is expressed by a fourth-order polynomial.

28. The apparatus of claim 27, wherein stepwise difference is the difference between two adjacent gradation conversion curves based a difference in a constant in the fourth-order polynomial.

* * * * *